2,571,451

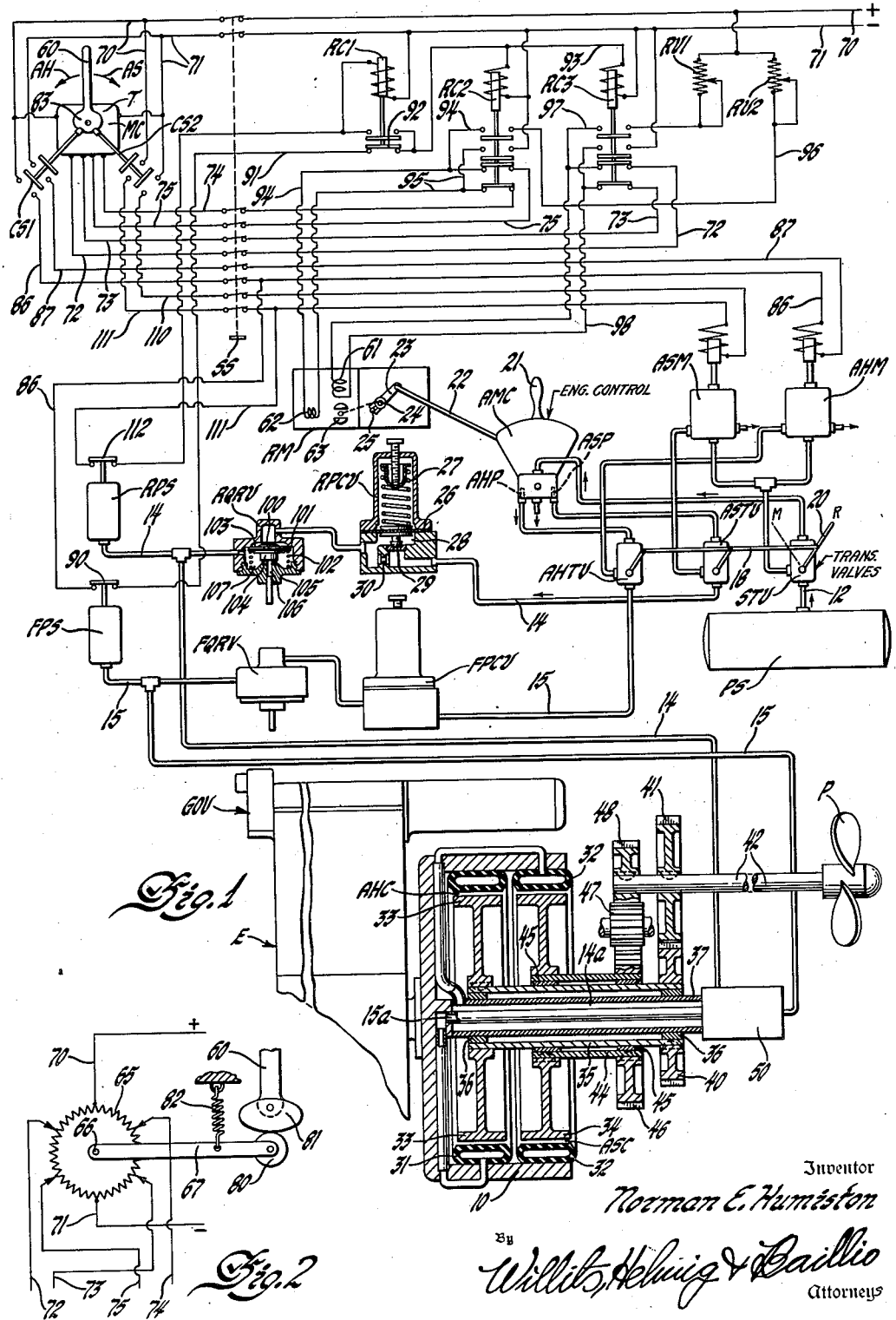
Oct. 16, 1951 — N. E. HUMISTON — 2,571,451
SHIP MANEUVERING CONTROL SYSTEM
Filed April 19, 1950
Inventor
Norman E. Humiston
By Willits, Helwig & Baillio
Attorneys Patented Oct. 16, 1951

UNITED STATES PATENT OFFICE 2,571,451

SHIP MANEUVERING CONTROL SYSTEM

Norman E. Humiston, Lakewood, Ohio, assignor to General Motors Corporation, Detroit, Mich., a corporation of Delaware Application April 19, 1950, Serial No. 156,767

14 Claims. (Cl. 115—34)

My invention relates to a control system, and particularly to a system for use on a ship for controlling the clutches by which an engine is connected through gears to the ship propeller to drive the ship in one direction or the other and for also controlling the speed of operation of the engine.

As ships are usually constructed the engine is mounted within the ship near the propeller so that the engine can drive the propeller in the most direct manner possible. Under most conditions it is desired to have the ship controlled by an operator located above the deck of the ship. Hence, the operator is situated some distance from the engine, and it is impossible for the operator to directly observe the operation of the engine and related equipment. On the other hand it is sometimes desired to have the engine and related apparatus controlled from the engine room by an individual who is situated so as to be able to directly observe the operation of the engine and related equipment.

In some installations the Diesel engine is connected through one or the other of two pneumatically controlled clutches to the gears which drive the propeller. The operation of these clutches is such that when a clutch is to be engaged, it is desirable to initially supply air under pressure to the clutch at a restricted rate so that the pressure in the clutch will build up gradually and the clutch will engage smoothly and will not grab. After the pressure in the clutch has built up to a value high enough to insure good engagement between the driving and driven members of the clutch, the rate of supply of air under pressure to the clutch may be greatly increased to promptly build up the pressure in the clutch to a value sufficient to prevent slippage of the clutch members.

In addition, in installations of this type it is desirable to have the diesel engine operate at a relatively low idling speed as long as both clutches are disengaged, that is when the engine is not under load. In the interests of maximum fuel economy the idling speed is kept as low as possible. Hence, when a clutch is being engaged so that a load is imposed on the engine, it is desirable to increase the engine speed somewhat to prevent stalling of the engine.

As explained above, the increases in clutch pressure must be effected at a restricted rate to prevent grabbing of a clutch. However, there is no need to delay release of a clutch. On the contrary, it is desirable to have the clutch controls arranged so that the air under pressure may be quickly released from a clutch to thereby effect quick release of a clutch and thus expedite maneuvering of a ship. In addition, it is desired to have the equipment operate at all times so that the clutches for opposite directions of movement can not be engaged concurrently, even for brief periods of time, as this might cause serious injury to the clutches or the driving gears.

An object of the invention is to provide an improved control system of the type described which provides means for controlling from a remote point the engine of a ship, and for also controlling clutches for connecting the engine to the propeller.

A further object of the invention is to provide an improved control system of the type described which is arranged so that the engine and clutches are at times controlled from a point remote from the engine and clutches, and at other times are controlled from a point adjacent the engine and clutches.

Another object of the invention is to provide a control system which is arranged to insure that engagement of the clutches will be gradual and gentle, and will be such that the clutches will at all times be capable of transmitting the power developed by the engine.

A further object of the invention is to provide a control system of the type described which employs fluid pressure operated clutches and is arranged so that the pressure in a clutch is gradually increased at a restricted rate until a predetermined pressure effective to produce good engagement of the clutch has been developed, and which is arranged so that the pressure in the clutch is thereafter increased at a rapid rate.

Another object of the invention is to provide a system of the type described which employs fluid pressure operated clutches and which incorporates means to insure rapid release of the clutches.

A further object of the invention is to provide a system of the type described which employs two fluid pressure operated clutches, one for each direction of movement, the system being arranged so that after a clutch is engaged it is certain to be released before the other one of the clutches becomes engaged.

Another object of the invention is to provide a system of the type described which employs two fluid pressure operated clutches, one for each direction of movement, and is arranged so that these clutches may be engaged and released with a minimum of delay to thereby expedite maneuvering of the ship.

A further object of the invention is to provide a control system of the type described which is arranged so that engagement and disengagement of the clutches, and changes in the engine speed, are effected by manipulation of a single control member.

Another object of the invention is to provide a control system of the type described which is arranged so that the engine speed is varied in accordance with the amount of movement of the control member away from its initial position, but is also arranged so that the engine speed cannot be materially increased until a clutch has become fully engaged.

A further object of the invention is to provide a control system of the type described which is arranged so that when the control member is in its initial position, the engine operates at a relatively low idling speed, and so that on movement of the control member away from its initial position to engage a clutch, the engine speed is automatically increased a predetermined small amount to prevent stalling of the engine when a load is imposed on the engine by engagement of the clutch, the control system also being arranged so that the operator is prevented from further increasing the speed of the engine until the clutch has become fully engaged, whereupon the operator is given unrestricted control of the engine speed.

Other objects of the invention and features of novelty will be apparent from the following description taken in connection with the accompanying drawings in which Figure 1 is a diagram showing the control system provided by my invention; and Figure 2 is a fragmentary view showing the transmitter which may be employed in the system shown in Figure 1.

In practicing my invention I provide magnet valves for supplying fluid under pressure to and for releasing fluid under pressure from the fluid pressure operated clutches. The supply pipe associated with each of the clutches is controlled by a valve device which restricts the rate of supply of fluid to a clutch until a predetermined pressure is built up in the clutch and thereafter permits fluid to flow to the clutch at a rapid rate to insure smooth engagement of the clutch followed by rapid increase in the degree of engagement of the clutch. The supply pipe associated with each of the clutches is also controlled by a valve device which insures rapid release of fluid from the clutch. In addition, I provide remote control apparatus for varying the adjustment of the engine governor in accordance with the amount of movement of a control member away from its initial position. I also provide means effective on initial movement of the control member for removing control of the governor from this control member, and for causing the remote control apparatus to adjust the governor to cause the engine to operate at a predetermined speed slightly higher than the idling speed until a clutch is fully engaged, and to thereupon restore control of the governor to this control member. The system also includes means for at times transferring control of the governor and the clutches from a control member located at a point remote from the engine and clutches to a different control member situated adjacent the engine and clutches.

Referring to the drawings, the propulsion system shown therein includes a prime mover in the form of a diesel engine E for driving the propeller P of a ship, not shown. The engine has a flywheel 10 which has associated therewith two fluid pressure operated clutches AHC and ASC by means of which the engine is selectively connected to the propeller P through one or the other of two sets of driving gears. One set of driving gears causes the engine to drive the propeller in one direction and the other set of driving gears causes the engine to drive the propeller in the opposite direction.

The engine E is provided with a governor GOV which may be of any well known type and which regulates the speed of the engine by regulating the supply of fuel to the engine. The details of the manner in which the governor controls the engine fuel supply are not necessary to an understanding of this invention and have not been shown. The speed at which the governor GOV causes the engine to operate is manually adjustable by moving an adjusting member on the governor. As hereinafter explained, the adjusting member may be moved by force applied thereto directly by an operator located adjacent the member, or it may be moved by force applied thereto indirectly by an operator located at a remote point. In the drawings the governor GOV is shown mounted on the engine E, and for convenience in arranging the apparatus, the governor is also shown detached from the engine.

The equipment on the ship includes a master controller MC which is located on the ship at a point remote from the engine and is the means by which the engine governor GOV, and the clutches AHC and ASC associated with the engine, are normally controlled. The equipment on the ship also includes an auxiliary master controller AMC which is located adjacent the engine and provides means for controlling the engine governor GOV, and the clutches associated with the engine directly from the engine room when such control is desirable.

Each of the master controllers has a handle which is biased by means not shown to an intermediate or "off" position in which both clutches are disengaged and in which the GOV causes the engine to operate at the idling speed. Each of these handles is movable in either direction from the "off" or intermediate position to cause engagement of one or the other of the clutches and to adjust the governor GOV to increase the engine speed. For purposes of illustration it will be assumed that movement of the handle of either master controller to the left from the intermediate position effects engagement of the clutch AHC for causing forward or ahead movement of the ship, and that movement of the handle of either master controller to the right from the intermediate position effects engagement of the clutch ASC for causing rearward or astern movement of the ship. In addition, except as hereinafter explained in detail, each of the master controllers is arranged to control the governor GOV to cause it to increase the engine speed in accordance with the amount of movement of the master controller handle away from the "off" position in either direction.

The master controller MC controls the supply of fluid under pressure to and the release of fluid under pressure from the clutches through magnet valves AHM and ASM. The magnet valves AHM and ASM may be of any well known construction and each operates when its winding is deenergized to connect to the atmosphere the supply pipe leading to the associated clutch. Each of these valves also operates when its winding is energized to cut off communication from the associated supply pipe to the atmosphere and to supply fluid under pressure to the supply pipe at the full pressure of the source of fluid under pressure.

The auxiliary master controller AMC controls the supply of fluid under pressure to and the release of fluid under pressure from the clutches through a forward pilot valve AHP and a reverse pilot valve ASP which are mounted on the housing of the auxiliary master controller. The pilot valves are of well known construction and each is controlled by a cam, not shown, on the shaft on which the handle of the auxiliary master controller AMC is mounted. Each of the pilot valves operates to cut off communication from the associated supply pipe to the atmosphere and to supply fluid under pressure to the associated supply pipe when and only when the handle of the auxiliary master controller is moved from the off or intermediate position in the direction for which the pilot valve is provided. Each of the pilot valves also operates to connect the associated supply pipe to the atmosphere when the handle of the auxiliary master controller AMC is in the off position, or is moved in the direction opposite to that for which the pilot valve is provided.

The equipment is arranged so that only one set of valve devices may control the supply of fluid to and the release of fluid from the clutches at one time, and so that the set of valve devices which is effective to exercise this control may be selected at will. As shown, there are transfer valves STV, AHTV and ASTV which govern the supply of fluid under pressure to and from the pilot and magnet valves. The transfer valve STV controls connection of the pilot valves and of the magnet valves with the supply pipe 12 leading from a source of fluid under pressure, such as the reservoir PS. It is assumed that the reservoir PS is filled with fluid under pressure which is maintained at the pressure which is desired for operation of the pneumatic clutches, as for example 85 pounds per square inch. The transfer valve ASTV controls connection of the pilot valve ASP and of the magnet valve ASM with the supply pipe 14 leading to the clutch ASC which governs movement of the ship astern. Similarly, the transfer valve AHTV controls connection of the pilot valve AHP and of the magnet valve AHM with the supply pipe 15 leading to the clutch AHC which governs movement of the ship ahead. Each of the transfer valves is a three way manually operated valve and has a rotatable element having passages therein adapted in one position of the element to render a pilot valve effective and adapted in another position of the element to render a magnet valve effective. The rotatable element of each of the transfer valves has an arm secured thereto. These arms are connected together by a link 18 so that the rotatable elements of all three transfer valves move in unison. The arm 20 associated with the valve STV is somewhat longer than the arms on the other two valves and serves as an operating lever for moving the rotating elements of all three valves. When the arm 20 is in the position R in which it is shown in the drawings, the equipment is conditioned for remote control and the magnet valves are effective and the pilot valves are ineffective. The arm 20 is movable from this position R in a counterclockwise direction to a position M in which the pilot valves are effective and the magnet valves are ineffective.

The handle 21 on the auxiliary master controller AMC is connected by a link 22 with an arm 23 on the governor GOV. The link 22 is controlled by the handle 21, by means not shown, in such manner that on movement of the handle 21 in either direction from the off position, the arm 23 is moved in accordance with the amount of movement of the handle 21 and changes the adjustment of the governor GOV to increase the speed of the engine E in accordance with the amount of movement of the handle 21 away from the "off" position.

The arm 23 is mounted on a shaft 24 associated with the governor GOV and is detachably connected with this shaft by suitable means, such as a pin 25 which is movable to either of two positions. In one of its positions the pin 25 permits the shaft 24 to turn freely relative to the arm 23. In its other position the pin 25 connects the shaft 24 and the arm 23 together so that they move as a unit and the arm 23 is effective to turn the shaft 24.

A pressure control valve RPCV is included in the supply pipe 14 leading from the transfer valve ASTV to the clutch ASC governing movement of the ship astern. A similar pressure control valve FPCV is included in the supply pipe 15 leading from the transfer valve AHTV to the clutch AHC governing movement of the ship ahead. The pressure control valves RPCV and FPCV permit fluid under pressure to flow therethrough only at a restricted rate until the pressure of the fluid in the associated supply pipe, and in the pressure chamber of the associated clutch, has built up to a predetermined intermediate pressure, such as 45 pounds to the square inch, and to thereafter permit fluid under pressure to flow therethrough at a rate limited only by the capacity of the supply lines.

The construction of the valve device RPCV is shown in detail and it is to be understood that the valve device FPCV is similar. As shown, the valve device RPCV has a diaphragm 26 which is clamped between confronting flanges on the members forming the body of the valve device. The diaphragm 26 is subject to the opposing forces of a spring 27 and of the pressure of the fluid in the chamber 28 which is open to the clutch ASC. The diaphragm 26 has secured thereto a valve element 29 which engages a seat surrounding a passage through which fluid under pressure may be supplied from the source to the chamber and thus to the clutch ASC. The passage controlled by the valve element 29 is by-passed by a passage which includes a choke 30 and through which fluid may flow only at a predetermined restricted rate.

As long as the pressure in the clutch ASC, and in the chamber 28, is below a predetermined value, such as 45 pounds per square inch, the valve 29 is seated, and the supply of fluid to the clutch is limited by the flow capacity of the choke 30. When the pressure in the clutch, and in the chamber 28, increases to the predetermined value, the diaphragm 26 is moved against the spring 27 so the valve 29 is lifted away from its seat, thereby opening a passage of large size through the valve device and permitting fluid to flow to the clutch at a rapid rate.

A quick release valve RQRV is included in the supply pipe 14 between the valve RPCV and the associated clutch. A similar quick release valve FQRV is included in the supply pipe 15 between the valve FPCV and the associated clutch. The quick release valves RQRV and FQRV operate to normally close communication from the associated supply pipes to the atmosphere and to permit fluid under pressure to flow without restriction to the associated clutches. Each of the quick release valves also operates so that on release of fluid under pressure from the associated supply pipe by the pilot or magnet valve controlling the supply pipe, the quick release valve opens a relatively large communication from the supply pipe to the atmosphere and through which fluid may discharge at a rapid rate. This enables the pressure in a clutch to be quickly reduced so that a clutch may be disengaged very rapidly and with a minimum of delay.

The construction of the valve device RQRV is shown in detail in the drawings and it is to be understood that the valve device FQRV is of similar construction. As shown, the valve device RQRV has a circular valve element 100 which is formed of molded composition, such as rubber, and has a flexible marginal portion 101 which is lightly pressed by a spring 102 against a substantially flat annular surface surrounding the passage or chamber 103 to which is connected the portion of the pipe 14 leading from the valve device RPCV. The valve element 100 has a relatively thick central portion 104 which engages the annular seat rib 105 surrounding the passage 106 which leads to the atmosphere. The seat rib 105 is of much smaller diameter than the annular surface engaged by the marginal portion 101 of the valve element 100. The area 107 outwardly of the seat rib 105 is connected by the supply pipe 14 to the chamber in the clutch ASC so this chamber 107 is at the same pressure as the chamber in the clutch.

On the supply of fluid under pressure from the valve RPCV, the pressure in the chamber 103 presses the valve element firmly against the seat rib 105 to close the exhaust opening, while the marginal portion 101 of the valve element 100 is deflected against the spring 102 so fluid under pressure flows freely to the chamber 107 and thus to the clutch ASC. When the supply of fluid under pressure from the valve RPCV is cut off, the pressures on opposite faces of the valve element 100 equalize, and the valve element 100 is held seated against the seat rib 105 by fluid under pressure in the chamber 103 pressing against an area of the valve element 100 equal to the area surrounded by the seat rib 105.

On release of fluid under pressure by the valve device RPCV, there is a reduction in the pressure of the fluid in the chamber 103 and the marginal portion 101 of the valve element 100 is held against its seat by the fluid under pressure in the chamber 107. At the same time the central portion 104 of the valve element 100 is deflected so that it is moved away from the seat rib 105 to permit fluid to escape at a rapid rate to the atmosphere from the chamber 107 and thus from the clutch ASC. Accordingly, the valve device RQRV does not interfere with the supply of fluid under pressure to the clutch ASC, but provides means to release fluid under pressure at a rapid rate directly from the clutch ASC to the atmosphere. Hence, on release of fluid from a clutch it is unnecessary for the fluid to flow through the various valve devices controlling the supply of fluid to the clutch. Instead the fluid is released directly to the atmosphere and release of a clutch takes place very promptly.

A pressure operated switch RPS is included in the supply pipe 14 at a point between the valve RQRV and the associated clutch. A similar pressure operated switch FPS is included in the supply pipe 15 at a point between the valve FQRV and the associated clutch. Each of the pressure operated switches, therefore, is responsive to the pressure of the fluid in the associated clutch. Each of the pressure operated switches is provided with a movable contact which is biased to a closed position. Each of the switches operates in such manner that its movable contact remains in the closed position until the pressure of the fluid in the associated supply pipe has built up to a predetermined relatively high value, such as 85 pounds to the square inch, that is substantially the maximum pressure which is developed in a clutch. Each of these switches also operates so that after its contact has been moved to the open position, the contact remains in that position until the pressure in the supply pipe is reduced to a somewhat lower pressure, such as 79 pounds per square inch.

This invention is not restricted to the use of any particular type of fluid pressure operated clutch, but I prefer to employ clutches of the type shown in the drawings. As is clearly shown in the drawings the flywheel 10 of the engine E has a relatively wide axially extending flange on its exposed face. On the inner face of this flange there are secured a forward or ahead clutch element or tire 31, and a rearward or astern clutch element or tire 32. Each of these clutch elements is in the form of a deformable annulus constructed of rubber or similar material and reenforced with fabric.

A driven member in the form of a drum 33 is located within the clutch element 31, and a similar driven member or drum 34 is located within the clutch element 32. The drum 33 is rigidly secured to one end of a sleeve 35 which is supported by bushings 36 on a shaft 37 which projects from the face of the flywheel 10. The other end of the sleeve 35 has rigidly secured thereto a gear 40 which meshes with a gear 41 on the shaft 42 on which the propeller P is mounted. When the drum 33 is rotated by the flywheel 10 the gear 40 turns the gear 41 to cause the propeller P to rotate in the direction to move the boat forward or ahead.

The drum 34 is rigidly secured to one end of a sleeve 44 which is supported by bushings 45 on the exterior of the sleeve 35. The other end of the sleeve 44 has rigidly secured thereto a gear 46 which meshes with an idler gear 47 which in turn meshes with the gear 48 on the propeller shaft 42. When the drum 34 is rotated by the flywheel 10, the gear 46 drives the gear 48 through the gear 47 to cause the propeller P to rotate in the direction to move the boat backwards or astern.

Each of the clutch elements 31 and 32 has an annular chamber therein which is adapted to be filled with fluid under pressure. Each of these clutch elements and the associated driven member or drum, is proportioned so that when the chamber in a clutch element is not filled with fluid under pressure, the radially inner face of the clutch element does not touch the outer face of the associated drum. Hence, as long as a clutch element is not inflated, there is no driving connection between the driving and driven members of the clutch, and either of the members of a clutch is free to rotate relative to the other.

When fluid under pressure is supplied to the chamber in a clutch element and the pressure in this chamber builds up, the element expands or deforms so that the inner part of the element moves radially inwardly and engages the surface of the associated drum throughout the circumference of the drum. Initial contact between a clutch element and the associated drum is established as soon as the pressure in the chamber in the clutch element reaches a relatively low value. At this time the clutch element is comparatively ineffective in driving the associated driven member or drum and there may be considerable slippage or relative movement between the clutch driving and driven members.

As the pressure in the chamber of the clutch element increases, the radially inner portion of the clutch element is pressed more firmly against the face of the associated drum so there is an increasingly effective driving connection between the clutch members. When the pressure of the fluid in the chamber of a clutch element increases to about 45 pounds to the square inch, the two clutch members are pressed together so firmly that there is substantially no slippage or relative movement between these members. At this time the clutch is capable of transmitting the power developed by the engine E when the engine is operating at the fuel setting corresponding to the idling speed or a slightly higher speed. On subsequent further increase in the pressure of the fluid in the chamber of a clutch element, the two members of the clutch are pressed more firmly into engagement so there is even more positive driving connection between the clutch members and less possibility of slippage or relative movement between them even when the power transmitted through the clutch is increased by an increase in the speed of the engine E.

When the fluid under pressure in the chamber of a clutch element is released, the inherent resiliency of the material of which the clutch element is constructed causes the radially inner face of the element to be drawn away from the associated drum or driven member and thus interrupt transmission of power between the members of the clutch.

The shaft 37 has formed therein a passage 14a which communicates through a connecting passage in the flywheel 10 with the chamber in the clutch element 32 of the astern clutch ASC. The shaft 37 also has formed therein a passage 15a which communicates through a connecting passage in the flywheel 10 with the chamber in the clutch element of the ahead clutch AHC. The passages 14a and 15a are of relatively large flow capacity so that they do not restrict the flow of fluid under pressure to and the release of fluid from the chambers in the clutch elements.

The supply pipes 14 and 15 communicate with the passages 14a and 15a, respectively, through a stuffing box 50 mounted on the end of the shaft 37.

The master controller MC may be of any well known construction and has a handle 60 which is secured on a shaft so as to be movable about a horizontal axis. As previously explained this handle is biased by suitable means to an "off" or intermediate position in which the handle is substantially vertical. The handle is at all times freely movable in either direction from this intermediate position.

The master controller handle 60 governs the transmitting member of remote control apparatus, the receiving member of which is associated with the engine governor GOV. The remote control apparatus provides means to transmit movement of the handle of the master controller MC, which is located at one point on the ship, to the governor GOV, which is located at a remote point on the ship, so that the governor may be adjustably regulated to vary the engine speed in accordance with the amount of movement of the master controller handle away from the "off" position.

The remote control apparatus by which movement of the handle of the master controller is transmitted to the engine governor GOV may be of any well known design, as for example the remote control system described by C. R. Mikolic in the Allis Chalmers Electrical Review for the First Quarter of 1946. This device employs a continuous potentiometer bridge circuit and has a transmitter incorporating a resistance bridge which is energized from a source of direct current. The resistance bridge of the transmitter governs the supply of energy to the control windings 61 and 62 of the receiver motor RM. The windings of the receiver motor control the motor armature 63 and cause the armature to move from an initial position in accordance with the degree of energization of the two windings. The resistance bridge in the transmitter is controlled by the handle 60 of the master controller MC in such manner that on movement of the handle 60 away from its "off" or intermediate position in either direction, the energy supplied to the windings 61 and 62 of the receiver motor will be varied in accordance with the amount of movement of the handle of the master controller. The resistance bridge in the transmitter is also controlled by the handle 60 of the master controller MC in such manner that the armature 63 of the receiver motor will move in the same direction from its initial position irrespective of the direction of movement of the handle of the master controller away from its "off" or intermediate position. Accordingly, the armature of the receiver motor will move an amount which varies in accordance with the amount of movement of the handle of the master controller MC away from its "off" position, but the armature 63 of the receiver motor RM does not respond to the direction of movement of the handle of the master controller away from its off position.

The construction of the transmitter of the remote control apparatus is shown diagrammatically in Figure 2 of the drawings. As shown there is a resistance element 65 formed of resistance wire wound upon a circular form which is mounted so as to be oscillatable about a shaft 66 by an arm 67. The wire 70 leading from the positive terminal of the source of direct current is permanently connected to one point on the resistance element 65, and the wire 71 leading from the negative terminal of this source is permanently connected to the diametrically opposite point on the resistance 65.

The wires 72 and 73 leading to the winding 61 of the receiver motor RM connect with the resistance element 65 through brushes which engage the resistance element at diametrically opposite points spaced counter-clockwise from the wires 70 and 71, respectively. The wires 74 and 75 leading to the winding 62 of the receiver motor RM connect with the resistance element 65 through brushes which engage the resistance element 65 at diametrically opposite points spaced clockwise from the wires 70 and 71, respectively.

The arm 67 has a roller 80 supported thereon and adapted to engage a cam 81 which is movable with the handle 60 of the master controller MC. The arm 67 is biased by a spring 82 to hold the roller 80 against the cam 81.

The various parts of the transmitter are arranged and proportioned so that when the handle 60 is in its intermediate or "off" position the right hand end of the arm 67 is in its extreme upper position and the energy supplied through the resistance element 65 to the windings 61 and 62 of the receiver motor RM is such that the armature 63 of the receiver motor occupies the position in which it conditions the governor GOV to cause the engine to operate at its idling speed.

On movement of the handle 60 of the master controller MC in either direction from its intermediate or "off" position, the cam 81 moves the right hand end of the arm 67 downwardly, thus turning the resistance element 65 and varying the current supplied through the resistance element to the windings 61 and 62 of the receiver motor RM. As previously explained, the equipment is arranged so that the current supplied to the windings of the receiver motor is controlled so that the armature 63 of the receiver motor RM moves in accordance with the amount of movement of the handle 60 of the master controller MC.

The armature 63 of the receiver motor is operatively connected to the governor GOV and controls the adjustment of the governor to vary the speed at which the engine E operates. When the armature 63 is in its initial position the governor GOV causes the engine E to operate at its idling speed, which is assumed to be 350 R. P. M. As the receiver motor armature 63 moves away from its initial position, the governor GOV increases the engine speed in accordance with the amount of movement of the receiver motor armature until the engine reaches its maximum speed which is assumed to be 750 R. P. M.

The master controller MC has associated therewith control relays RC1, RC2, and RC3 which when released establish circuits which permit the control windings 61 and 62 of the receiver motor RM to be controlled by the transmitter associated with the master controller MC. When the relays RC2 and RC3 are picked up, the circuits over which the control windings 61 and 62 of the receiver motor are governed by the transmitter associated with the master controller are interrupted and circuits are established to energize these windings through resistors RV1 and RV2 which are of such value as to cause the receiver motor windings to be energized with currents which cause the armature 63 of the receiver motor RM to move away from its initial position a small amount. On this movement of the armature 63 of the receiver motor the governor GOV increases the speed of the engine slightly, and for purposes of illustration it will be assumed that when the windings of the receiver motor RM are energized through the resistors RV1 and RV2, the engine speed is 375 R. P. M.

The master controller MC also has associated therewith switches CS1 and CS2 each of which has contacts biased to their open position by means not shown. A cam 83 on the shaft on which the handle 60 of the master controller MC is mounted moves the contacts of these switches to their closed positions against the biasing means. The equipment is arranged so that on initial movement of the master controller handle 60 away from its "off" position towards the ahead position, the contacts of the switch CS1 are closed, and so that the contacts of this switch remain closed as long as the master controller handle is in any portion of its ahead zone. Similarly, the equipment is arranged so that on initial movement of the handle 60 of the master controller MC towards the astern position, the contacts of the switch CS2 are closed, and so that these contacts remain closed as long as the handle 60 is in any portion of its astern zone. The switch CS1 controls the supply of energy to the winding of the ahead magnet valve AHM, and the switch CS2 controls the circuit of the astern magnet valve ASM.

The circuits by which the master controller MC governs the magnet valves ASM and AHM, and the control windings 61 and 62 of the receiver motor, and the circuit over which energy is supplied from the source of direct current, are controlled by contacts of a manually operated selector switch SS. This switch is arranged so that all of its contacts are closed or open at the same time, and so that the contacts, when moved to either position, remain in that position until manually moved to their other position.

*Operation*

The equipment is shown in the condition which it assumes when the ship is to be controlled by the master controller MC, and when the handle 60 of the master controller is in its "off" position. As the ship is being controlled by the master controller MC, the contacts of the selector switch SS are closed, the handle 20 of the transfer valve is in the remote position R to render the magnet valves AHM and ASM effective and the pilot valves AHP and ASP ineffective, and the pin 25 is in the position to permit the arm 23 to move freely relative to the shaft 24.

As the handle 60 of the master controller MC is in the "off" position, the magnet valves AHM and ASM are deenergized and connect the associated supply pipes to the atmosphere and both of the clutches AHC and ASC are disengaged. In addition, at this time the receiver motor RM conditions the governor GOV to cause the engine E to operate at the idling speed.

If the operator wishes to cause the ship to move ahead, it is necessary only to move the handle 60 of the master controller MC from the "off" position to a position in the ahead zone. As hereinafter explained, the handle may be moved all of the way to the extreme end of the ahead zone if the operator desires.

On initial movement of the handle 60 of the master controller MC into the ahead zone, the cam 83 closes the contacts of switch CS1 so that wire 70, which leads from the positive terminal of the source, is connected over a contact of switch CS1 to wire 86 leading to one terminal of the winding of the ahead magnet valve AHM, and wire 71, which leads from the negative terminal of the source, is connected to wire 87 leading to the other terminal of the winding of the magnet valve AHM. Hence, the winding of the magnet valve AHM is energized and this valve device cuts off communication from the supply pipe 15 to the atmosphere, and causes fluid under pressure to be supplied from the reservoir PS to the supply pipe 15 and thus through the valve devices FPCV and FQRV and the passages 15a to the chamber in the element 31 of the ahead clutch AHC. As previously explained, the valve device FPCV limits the initial rate of supply of fluid to the clutch AHC so the pressure in the clutch builds up gradually.

In addition, on movement of the handle 60 to the ahead zone, and closure of the contacts of the switch CS1, a circuit is established for energizing the windings of the relays RC2 and RC3 in parallel. This circuit may be traced from a branch of the wire 86, to which the positive terminal of the source is connected, over contact 90 of pressure switch FPS, wire 91, contact 92 of relay RC1, wire 93, through the winding of relay RC2 to wire 71, and also through the winding of relay RC3 to the wire 71. Hence, the contacts of relays RC2 and RC3 pick up immediately upon movement of the handle 60 of the master controller MC to close the contacts of the switch CS1.

When the contacts of relay RC2 pick up, connection is interrupted between wires 74 and 75, leading from the transmitter in the master MC, to the wires 94 and 95 leading to the winding 62 of the receiver motor RM. When the contacts of relay RC2 are picked up the wire 94 is connected over a contact of relay RC2 and over wire 96 through the resistance RV2 to the wire 70, and wire 95 is connected over a contact of relay RC2 to wire 71. Similarly, when relay RC3 picks up its contacts interrupt connection between wires 72 and 73, leading from the transmitter in the master controller MC, and the wires 97 and 98 leading to the winding 61 of the receiver motor RM. When the contacts of the relay RC3 are picked up, the wire 97 is connected over a contact of relay RC3 and through the resistance RV1 to the wire 70, and wire 98 is connected over a contact of relay RC3 to wire 71.

Accordingly, as soon as the handle 60 is moved to a position in the ahead zone, the relays RC2 and RC3 pick up and transfer the control of the windings of the receiver motor RM from the transmitter in the master controller MC to the resistors RV1 and RV2. As previously explained, these resistors cause the receiver motor windings to be energized in such manner that the governor GOV increases the engine speed from 350 to 375 R. P. M. This increase in engine speed insures that the engine will not stall when load is imposed thereon, as will occur as soon as the clutch AHC engages. This increase on the speed of the engine is not such as to interfere with engagement of the clutch or impose an excessive load on the clutch. As long as the relays RC2 and RC3 remain picked up the engine speed is limited to that determined by the resistors RV1 and RV2, and the receiver motor RM is removed from the control of the operator so the operator is incapable of increasing the engine speed by moving the handle 60 of the master controller MC.

As stated above, the magnet valve AHM operates to supply fluid under pressure to the supply pipe 15 as soon as the handle 60 of the master controller MC is moved to a position in the ahead zone. The rate of supply of fluid through the supply pipe 15 to the clutch AHC is limited by the valve device FPCV so the pressure in the clutch AHC builds up gradually and driving engagement between the clutch driving and driven members takes place smoothly and gradually until the driving and driven members rotate at the same speed. At this time, the drum 33 is rotated, and the gear 40 turns gear 41 to rotate the propeller P in the direction to drive the ship ahead. In addition, at this time force is transmitted from the shaft 42 through the gears 48, 47 and 46 to rotate the drum 34 in the opposite direction to that in which the flywheel 10 is rotated. However, the element 32 of clutch ASC is not inflated, so the drum 34 is free to rotate.

When the pressure of the fluid in the clutch AHC has increased to a value sufficient to cause full, non-slipping engagement of the elements of the clutch, this pressure being on the order of 45 pounds per square inch, the valve device FPCV operates to increase the rate of flow of fluid to the clutch so that the pressure in the clutch is thereafter rapidly increased to the full pressure of the fluid in the reservoir PS. Hence, initial engagement of the clutch is slow and gradual and the engine E will not be stalled, particularly in view of the increase in engine speed. The gradual engagement of the clutch continues until the engagement is sufficient to transmit all of the power developed by the engine at the existing speed and fuel setting of the engine, whereupon the degree of engagement of the clutch is rapidly increased to the point at which the clutch is capable of transmitting the power developed by the engine at other speeds and fuel settings.

When the pressure in the clutch AHC builds up substantially to the full pressure of the fluid supplied from the reservoir PS, the contact 90 of the fluid pressure switch FPS is opened, thus interrupting the circuit for energizing the windings of the relays RC2 and RC3. Hence, the contacts of these relays release to interrupt the circuits including the resistors RV1 and RV2 for supplying energy to the windings 61 and 62 of the receiver motor RM and connect these windings to the transmitter in the master controller. Accordingly, the receiver motor RM is under the control of the transmitter in the master controller MC and the armature 63 of the motor RM will move to a position corresponding to the position to which the handle 60 of the master controller MC has been moved. As a result of this movement of the armature 63 of the motor RM the governor GOV will be adjusted to cause the engine E to operate at a speed determined by the position of the handle 60 of the master controller. If the handle 60 is moved to the left to the extreme end of its range of movement in the ahead zone, the receiver motor RM will control the governor GOV to cause the engine to operate at full speed. Similarly, if the handle 60 is moved to an intermediate position in its range of movement, the motor RM will control the governor GOV to cause the engine to operate at an intermediate speed. Thus the engine is under the control of the operator and he may vary it as he wishes.

During the movement of the handle 60 of the master controller MC to different positions in the ahead zone subsequent to release of the relays RC2 and RC3, the pressure of the fluid in the clutch AHC is unaffected and remains at the full pressure supplied from the reservoir PS so that the clutch AHC is at all times capable of transmitting the power developed by the engine E without danger of slippage of the clutch members.

If after the ship has been operated in the ahead direction for a time the operator moves the handle 60 of the master controller MC to the "off" position momentarily, thus initiating release of the ahead clutch, and then returns the handle 60 to a position in the ahead zone, the equipment will automatically restrict the engine speed until the pressure in the ahead clutch is sufficient to prevent slippage of the clutch, and will then permit the operator to increase the engine speed as desired.

When the handle 60 of the master controller MC is moved from a position in the ahead zone to the "off" position, the contacts of switch CS1 open and the winding of magnet valve AHM is deenergized so that this valve releases fluid from the supply pipe 15 leading to the clutch AHC. As explained above, the valve device FQRV operates to release fluid from the clutch AHC at a rapid rate so there is a rapid reduction in the pressure in the clutch. As soon as the pressure in the clutch has reduced a small amount, as for example from 85 to 79 pounds per square inch, the contact 90 of switch FPS closes. If the handle 60 of the master controller MC is now returned to a position in the ahead zone the contacts of switch CS1 will close to reestablish the circuit for supplying energy to the winding of the magnet valve AHM so this valve cuts off the release of fluid from the clutch AHC and causes fluid to be supplied thereto. When the contacts of switch CS1 close, and contact 90 of switch FPS is closed, the windings of the relays RC2 and RC3 are energized over the previously traced circuit. Hence, the relay contacts pick up to remove control of the receiver motor RM from the transmitter in the master controller MC and to energize the receiver motor windings through the resistors RV1 and RV2. This causes the governor GOV to limit the engine speed to a relatively low value until the pressure in the clutch AHC is restored to a value high enough to open the contact 90 of switch FPS, whereupon the relays RC2 and RC3 release and restore control of the receiver motor to the master controller.

The operation of the equipment is such, therefore, that after partial release of a clutch, the control of the engine speed is removed from the operator until the pressure in the clutch has been restored to a value high enough to insure proper operation of the clutch.

If after the ship has been operated ahead for a period, the operator wishes to operate it in the opposite direction, that is, astern, it is only necessary for the operator to move the handle 60 of the master controller MC from a position in the ahead zone to a position in the astern zone. The handle is freely movable between these positions at all times and this control system is arranged so that there is no need for the operator to delay movement of the handle 60 between positions for opposite directions of movement.

When the handle 60 is moved out of the ahead zone the contacts of switch CS1 open and interrupt the circuit of wires 86 and 87 leading to the winding of the magnet valve AHM. As a result this valve device cuts off the supply of fluid under pressure to the supply pipe 15 and releases fluid from this pipe. On the release of fluid from the pipe 15, the valve device FQRV operates to release fluid from the pipe 15, and from the clutch AHC, at a rapid rate so that the clutch is disengaged in a minimum amount of time.

As soon as the handle 60 of the master controller MC is moved to a position in the astern zone, the contacts of the switch CS2 are closed and connect the supply wires 70 and 71 to the wires 110 and 111 leading to the winding of the magnet valve ASM and this valve operates to cut off communication from the supply pipe 14 to the atmosphere and to supply fluid to this pipe and thus to the clutch ASC. The valve device RPCV restricts the initial supply of fluid to the clutch ASC to a relatively slow rate so the clutch ASC is not immediately effective.

In addition, when the switch CS2 closes, energy is supplied to relay RC1 over the circuit which includes a branch of wire 111, contact 112 of pressure switch RPS, and the winding of relay RC1. On the supply of energy to the winding of relay RC1 the relay contacts pick up and connect the windings of the relays RC2 and RC3 to a branch of the circuit just traced. Hence, the contacts of the relays RC2 and RC3 pick up to transfer control of the windings 61 and 62 of the receiver motor RM from the transmitter in the master controller MC to the resistance units RV1 and RV2. As explained above, this causes the receiver motor RM to adjust the governor GOV to cause the engine E to operate at a speed slightly above the idling speed so the engine will not stall when a load is imposed thereon, but at the same time the engine will not operate rapidly enough to interfere with proper engagement of a clutch.

As a result of the supply of fluid under pressure at a restricted rate to the clutch ASC, the element 32 of the clutch is inflated and gradually presses against the drum 34. On initial engagement of the member 32 with the drum 34, the drum may be rotating in the opposite direction to the fly wheel 10. This reverse rotation of the drum 34 relative to the flywheel 10 may be caused by force applied thereto from the propeller P or from the ahead clutch AHC. However, when the member 32 expands, this rotation of the drum 34 stops and the drum 34 begins to be driven in the same direction as the flywheel 10. Because of the restricted rate at which fluid under pressure is initially supplied to the clutch ASC, the engagement of the member 32 with the drum 34 is gradual so that rotation of the drum 34, and of the propeller P, is slowly brought to a stop and these members are then slowly caused to rotate in the opposite direction.

At this time, because of the rapid release of fluid from the ahead clutch AHC through the valve device FQRV, and the restricted rate of supply of fluid to the astern clutch ASC through the valve device RPCV, the clutch AHC is certain to be substantially fully released to substantially cease exerting driving force on the gearing, and on the propeller P, before the astern clutch ASC becomes effective to exert driving force of substantial value on the gearing and on the propeller. Hence, the equipment is arranged so that the ahead and astern clutches AHC and ASC will not simultaneously transmit driving force of substantial value. This is true even though the handle of the master controller MC is moved directly from a position in the ahead zone to a position in the astern zone. As the two clutches are not simultaneously effective, there is no possibility that the gearing or the clutches will be damaged by application thereto of opposing forces of substantial magnitude.

When the pressure of the fluid in the astern clutch ASC has built up to the predetermined intermediate value, such as 45 pounds to the square inch, which is effective to insure full driving engagement of the clutch members at the existing engine speed, the valve device RPCV operates to increase the rate of flow of fluid to the clutch and the pressure in the clutch rapidly builds up to the pressure of the fluid supplied from the reservoir PS. When the pressure of the fluid in the clutch ASC approaches the maximum pressure, the contact 112 of switch RPS opens, the circuit for supplying energy to the windings of relays RC1, RC2 and RC3 and the contacts of these relays release. On release of relays RC2 and RC3 the control of the windings 61 and 62 of the receiver motor RM is removed from the resistances RV1 and RV2 and is transferred to the transmitter in the master controller MC. The armature C3 of the receiver motor RM, therefore, moves to the position determined by the position of the handle 60 of the master controller MC and causes the governor GOV to regulate the engine speed according to the position of the handle 60. The engine is now under the control of the operator and he may vary the engine speed as desired by moving the handle 60 to different positions in the astern zone.

On movement of the handle 60 of the master controller MC from a position in the astern zone to the "off" position, and then back to the astern zone, or directly from a position in the astern zone to a position in the ahead zone, the equipment operates in a manner similar to that described in detail for corresponding movements of the handle 60 from a position in the ahead zone.

When the handle 60 is moved from a position in the astern zone to the "off" position, the contacts of switch CS2 open to deenergize the winding of magnet valve ASM so that it releases the fluid under pressure from the clutch ASC. At the same time the transmitter in the master controller M causes the receiver motor RM to condition the governor GOV to cause the engine E to operate at its idling speed.

*Control by auxiliary master controller*

Although the ship is normally controlled by the master controller MC, it is desirable at times to control the engine and the clutches from the engine room, and the auxiliary master controller AMC is provided for this purpose.

When the auxiliary master controller is to be employed, the main master controller MC is made ineffective by opening the selector switch SS, and by moving the handle 20 to its position M to cause the transfer valves STV, ASTV and AHTV to disconnect the magnet valves AHM and ASM and to connect the pilot valves AHP and ASP. In addition, the pin 25 is moved to its other position to connect the arm 23 to the shaft 24 of the governor GOV. As previously explained, on movement of the handle 21 of the auxiliary master controller AMC in either direction from its intermediate or "off" position, the arm 23 is moved so as to cause the governor GOV to increase the engine speed in accordance with the amount of movement of the handle 21.

On initial movement of the handle 21 away from the "off" position to a position in the ahead zone, the pilot valve AHP cuts off communication from the supply pipe 15 to the atmosphere and causes fluid under pressure to be supplied through this pipe, and thus through the valve device FPCV, to the clutch AHC. Hence, the pressure of the fluid in the clutch AHC initially builds up at a restricted rate to insure smooth, gradual engagement of the clutch, and thereafter builds up at a rapid rate.

On movement of the handle 21 of the auxiliary master controller AMC to a position in the ahead zone, the governor GOV is immediately conditioned to cause the engine E to operate at a speed determined by the position of the handle 21. Hence, the speed of the engine E may be increased rapidly and without any delay. Similarly, at this time the handle 21 may not be moved far enough into the ahead zone to materially increase the engine speed above the idling speed. The auxiliary master controller AMC is located adjacent the engine E so that the operator can observe operation of the engine and can see whether the speed of the engine is being increased too rapidly for the clutch to engage properly, or is in danger of stalling because of the imposition of a load thereon. As the operator can observe the engine, he can manipulate the handle 21 to properly regulate the engine speed.

On subsequent movement of the handle 21 to the "off" position, the pilot valve AHP cuts off the supply of fluid to the supply pipe 15 and releases fluid therefrom so that the valve device FQRV releases fluid from the pipe 15 at a rapid rate so the clutch AHC is promptly released.

On movement of the handle 21 to a position in the astern zone the equipment operates in a similar manner, the pilot valve ASP causing fluid to be supplied to the clutch ASC to effect engagement of this clutch. On return of the handle 21 to the "off" position the valve ASP releases fluid from the clutch ASC to release this clutch.

The equipment is arranged so that the clutches cannot be simultaneously engaged as a result of rapid movement of the handle 21 between the ahead and astern zones. The auxiliary master controller AMC controls the clutches through the valve devices RPCV, RQRV, FPCV and FQRV, so that engagement of a clutch takes place at a restricted rate, but release takes place rapidly and without delay. Accordingly, when the handle 21 is in one zone, and the corresponding clutch is engaged, and the handle is then moved to the other zone, the clutch which is engaged releases promptly, but engagement of the other clutch is delayed until after the first clutch has become released. This eliminates the possibility of damage to the clutches, or to the driving gears, which might occur if the two clutches should be engaged simultaneously.

When the control by the master controller MC is to be restored, the selector switch SS is closed, the handle 20 associated with the transfer valves is moved to its position R, and the pin 25 is moved to the position in which it disconnects the arm 23 from the shaft 24 of the governor GOV.

*Summary*

From the foregoing it will be seen that this control system enables the engine and the clutches to be controlled from a remote point at times and to be controlled from the engine room at other times. Irrespective of the point from which the engine and clutches are controlled, the system operates to insure smooth, gradual engagement of the clutches and to permit the clutches for opposite directions of movement to be released and engaged with a minimum of delay so that the ship can be maneuvered with the maximum flexibility. In addition, the control system is arranged so that regardless of the manner in which the operator manipulates a control handle, the clutches for opposite directions of movement will not be effectively engaged at the same time. Hence, the operator is free to move the control handle at will, and need not be concerned with the possibility of injuring the equipment by causing simultaneous engagement of the clutches for opposite directions of movement.

When the engine and clutches are controlled by an operator at a remote point, the operator is unable to observe the engine, and the system incorporates means to insure that when the engine and clutches are controlled from a remote point, the speed of the engine will be properly regulated and to also insure that engagement of the clutches will be properly effected. When the equipment is being controlled from a remote point, and the handle of the controller is moved to a position in either the ahead or astern zones, the control of the engine speed is removed from the operator until the corresponding clutch is fully engaged and is prepared to transmit the power developed by the engine. At the same time, the engine speed is increased a predetermined small amount from the idling speed to prevent stalling of the engine when a load is imposed thereon, but not enough to interfere with engagement of the clutch. The clutch is controlled so that its engagement is slow and gradual until the degree of engagement has been built up to a value adequate to transmit all of the power developed by the engine at the existing engine fuel and speed setting. Thereafter the degree of engagement of the clutch is rapidly increased to the maximum so that the clutch is capable of transmitting the power developed by the engine at any speed or fuel setting. When this degree of clutch engagement is secured, the control of the engine speed is restored to the operator and he may vary the engine speed at will, the full engagement of the clutch being maintained until the control member is moved to its "off" position, or to a position in the opposite zone, to indicate that engagement of the clutch is no longer desired. This arrangement insures that the speed of the engine, and the engagement of the clutches, will be properly controlled even though the operator is situated so that he cannot observe the engine and clutches. In addition, this arrangement makes it unnecessary for the operator to be concerned with the engine and clutches and permits the operator to move the control handle freely and without restriction and to give his undivided attention to movement of the ship.

Although I have illustrated and described one form of ship maneuvering control system embodying my invention, it should be understood that the invention is not limited to these details of construction and that numerous changes and modifications may be made therein without departing from the spirit and scope of the following claims.

I claim:

1. In control means for use with ship propulsion apparatus which includes an engine, a propeller, a forward fluid pressure operated clutch for connecting said engine to drive said propeller in the forward direction, and a reverse fluid pressure operated clutch for connecting said engine to drive said propeller in the reverse direction, each of said clutches being ineffective to connect the engine and propeller when the fluid in a chamber in the clutch is released and being effective to establish driving connection between the engine and propeller as the pressure of the fluid in said chamber is increased, each of said clutches being capable of transmitting the power developed by said engine substantially at the idling speed when the pressure of the fluid in the clutch chamber is at a predetermined intermediate value and being capable of transmitting the power developed by said engine at full speed when the pressure of the fluid in the clutch chamber is at a predetermined high value, said control means comprising a control member having an off position, said control member being manually movable from said off position in one direction to a forward position and being manually movable from said off position in the other direction to a reverse position, means effective when said control member is in said off position to release fluid under pressure from the chambers of both of said clutches and to cause said engine to operate at the idling speed, means effective when said control member is moved from said off position towards said forward position to supply fluid under pressure at a restricted rate to the chamber in the forward clutch until the pressure in said chamber is substantially at the predetermined intermediate value and to thereafter supply fluid under pressure at a rapid rate to said chamber until the pressure in said chamber is substantially at the predetermined high value, means effective when said control member is moved from said off position towards said reverse position to supply fluid under pressure at a restricted rate to the chamber in the reverse clutch until the pressure in said chamber is substantially at the predetermined intermediate value and to thereafter supply fluid under pressure at a rapid rate to said chamber until the pressure in said chamber is at the predetermined high value, and means for increasing the speed of said engine in accordance with the extent of movement of said control member away from said off position in either direction provided the pressure of the fluid in the chamber of the clutch for the direction in which the control member has been moved away from the off position is substantially at said predetermined high value.

2. In control means for use with ship propulsion apparatus which includes an engine, a propeller, and a fluid pressure operated clutch for connecting said engine to drive said propeller, said clutch being ineffective to connect the engine and propeller when the fluid in a chamber in the clutch is released and being effective to establish driving connection between the engine and propeller as the pressure of the fluid in said chamber is increased, said clutch being capable of transmitting the power developed by said engine substantially at the idling speed when the pressure of the fluid in the clutch chamber is at a predetermined intermediate value and being capable of transmitting the power developed by said engine at full speed when the pressure of the fluid in the clutch chamber is at a predetermined high value, said control means comprising a control member having an off position and being manually movable therefrom through an operating zone to an on position, means effective when said control member is in said off position to release fluid under pressure from the chamber in said clutch and to cause said engine to operate at the idling speed, means effective when said control member is moved to a position in said operating zone to supply fluid under pressure at a restricted rate to the chamber in said clutch until the pressure in said chamber is substantially at the predetermined intermediate value and to thereafter supply fluid under pressure at a rapid rate to said chamber until the pressure in said chamber is substantially at the predetermined high value, and means for increasing the speed of said engine in accordance with the position of said control member in said operating zone provided the pressure of the fluid in the chamber of said clutch is substantially at said predetermined high value.

3. In control means for use with ship propulsion apparatus which includes an engine, a propeller, and a fluid pressure operated clutch for connecting said engine to drive said propeller, said clutch being ineffective to connect the engine and propeller when the fluid in a chamber in the clutch is released and being effective to establish driving connection between the engine and propeller as the pressure of the fluid in said chamber is increased, said clutch being capable of transmitting the power developed by said engine substantially at the idling speed when the pressure of the fluid in the clutch chamber is at a predetermined intermediate value and being capable of transmitting the power developed by said engine at full speed when the pressure of the fluid in the clutch chamber is at a predetermined high value, said control means comprising a control member having an off position and being manually movable therefrom through an operating zone to an on position, means effective when said control member is in said off position to release fluid under pressure from the chamber in said clutch and to cause said engine to operate at the idling speed, means effective when said control member is moved to a position in said operating zone to supply fluid under pressure at a restricted rate to the chamber in said clutch until the pressure in said chamber is substantially at the predetermined intermediate value and to thereafter supply fluid under pressure at a rapid rate to said chamber until the pressure in said chamber is substantially at the predetermined high value, means effective when said control member is in any portion of its operating zone and the pressure in said clutch chamber is substantially below said predetermined high value for causing said engine to operate at a speed slightly higher than the idling speed, and means effective when said control member is in its operating zone and the pressure of the fluid in said clutch chamber is substantially at said predetermined high value for causing said engine to operate at a speed governed by the position of said control member in said operating zone.

4. In control means for use with ship propulsion apparatus which includes an engine, a propeller, and a fluid pressure operated clutch for connecting said engine to drive said propeller, said clutch being ineffective to connect the engine and propeller when the fluid in a chamber in the clutch is released and being effective to establish driving connection between the engine and propeller as the pressure of the fluid in said chamber is increased, said clutch being capable of transmitting the power developed by said engine substantially at the idling speed when the pressure of the fluid in the clutch chamber is at a predetermined intermediate value and being capable of transmitting the power developed by said engine at full speed when the pressure of the fluid in the clutch chamber is at a predetermined high value, said control means comprising a control member having an off position and being manually movable therefrom through an operating zone to an on position, means effective when said control member is in said off position to release fluid under pressure from the chamber in said clutch and to cause said engine to operate at the idling speed, means effective when said control member is moved to a position in said operating zone to supply fluid under pressure at a restricted rate to the chamber in said clutch until the pressure in said chamber is substantially at the predetermined intermediate value and to thereafter supply fluid under pressure at a rapid rate to said chamber until the pressure in said chamber is substantially at the predetermined high value, and means governed by the pressure of the fluid in said clutch chamber and by the position of said control member for varying the speed of said engine, said last named means being effective when said control member is moved to a position in its operating zone to cause said engine to operate at a predetermined speed slightly higher than the idling speed as long as the pressure of the fluid in said clutch chamber is substantially below said predetermined high value and to cause said engine to operate at a speed determined by the position of said control member in its operating zone when the pressure of the fluid in said clutch chamber is substantially at said predetermined high value.

5. In control means for use with ship propulsion apparatus which includes an engine, a propeller and a fluid pressure operated clutch for connecting said engine to drive said propeller, said clutch being ineffective to connect the engine and propeller when the fluid in a chamber in the clutch is released and being effective to fully connect the engine and propeller when the pressure of the fluid in said clutch chamber is at a predetermined value, said control means comprising a control member having an off position and being manually movable therefrom through an operating zone to an on position, means effective when said control member is in said off position to release fluid under pressure from the chamber in said clutch and to cause said engine to operate at the idling speed, means effective when said control member is moved to a position in said operating zone to supply fluid under pressure to said clutch chamber, and means governed by the pressure of the fluid in said clutch chamber and by the position of said control member for varying the speed of said engine, said last named means being effective when said control member is moved to a position in its operating zone to cause said engine to operate at a predetermined speed slightly higher than the idling speed as long as the pressure of the fluid in said clutch chamber is substantially below said predetermined high value and to cause said engine to operate at a speed determined by the position of said control member in the operating zone when the pressure of the fluid in said clutch chamber is substantially at said predetermined value.

6. In control means for use with ship propulsion apparatus which includes an engine, a propeller, a forward fluid pressure operated clutch for connecting said engine to drive said propeller in the forward direction, and a reverse fluid pressure operated clutch for connecting said engine to drive said propeller in the reverse direction, each of said clutches being ineffective to connect the engine and propeller when the fluid in a chamber in the clutch is released and being effective to fully connect the engine and propeller when the pressure of the fluid in the clutch chamber is at a predetermined value, said control means comprising a control member having an off position, said control member being manually movable from said off position in one direction through a forward operating zone and in the other direction through a reverse operating zone, means effective when said control member is in said off position to release fluid under pressure from the chambers in said clutches and to cause said engine to operate at the idling speed, means effective on movement of said control member to either of said operating zones to supply fluid under pressure to the chamber in the corresponding clutch, and means governed by the pressure of the fluid in said clutch chambers and by the position of said control member for varying the speed of said engine, said last named means being effective when said control member is moved to a position in either of said operating zones to cause said engine to operate at a predetermined speed slightly higher than the idling speed as long as the pressure of the fluid in the chamber of the corresponding clutch is substantially below said predetermined value and to cause said engine to operate at a speed determined by the position of said control member in said operating zone when the pressure of the fluid in the chamber of the corresponding clutch is substantially at said predetermined value.

7. In control means for use with ship propulsion apparatus which includes an engine, a propeller, a forward fluid pressure operated clutch for connecting said engine to drive said propeller in the forward direction, and a reverse fluid pressure operated clutch for connecting said engine to drive said propeller in the reverse direction, each of said clutches being ineffective to connect the engine and propeller when the fluid in a chamber in the clutch is released and being effective to fully connect the engine and propeller when the pressure of the fluid in the clutch chamber is at a predetermined value, said control means comprising a control member having an off position, said control member being manually movable from said off position in one direction through a forward operating zone and in the other direction through a reverse operating zone, means effective when said control member is in said off position to release fluid under pressure from the chambers in said clutches and to cause said engine to operate at the idling speed, means effective on movement of said control member to either of said operating zones to supply fluid under pressure to the chamber in the corresponding clutch, and means governed by the pressure of the fluid in said clutch chambers and by the position of said control member for varying the speed of said engine, said last named means being effective when said control member is moved to a position in either of said operating zones to cause said engine to operate at a predetermined speed slightly higher than the idling speed or to operate at a speed governed by the position of said control member in said operating zone according as the pressure of the fluid in the chamber of the corresponding clutch is substantially below or is substantially at said predetermined value.

8. In control means for use with ship propulsion apparatus which includes an engine, a propeller, a forward fluid pressure operated clutch for connecting said engine to drive said propeller in the forward direction, and a reverse fluid pressure operated clutch for connecting said engine to drive said propeller in the reverse direction, each of said clutches being ineffective to connect the engine and propeller when the fluid in a chamber in the clutch is released and being effective to fully connect the engine and propeller when the pressure of the fluid in the clutch chamber is at a predetermined value, said control means comprising a control member having an off position, said control member being manually movable from said off position in one direction to a forward operating position and in the other direction to a reverse operating position, means effective when said control member is in said off position to cause the fluid in each of said clutch chambers to be maintained at a low ineffective pressure, means effective when said control member is moved to either of its operating positions to cause fluid under pressure to be supplied to the chamber of the corresponding clutch at a restricted rate until a predetermined pressure is built up in said chamber and to thereafter be supplied at a rapid rate, and means effective when said control member is moved from either of its operating positions to the off position or to the other one of said operating positions for causing fluid under pressure to be released at a rapid rate from the chamber of the clutch corresponding to the operating position from which said control member has been moved, the means for controlling the supply of fluid to and release of fluid from said clutch chambers being arranged so that on rapid movement of said control member between its operating positions the pressure of the fluid in the chamber of the clutch corresponding to the operating position from which said control member has been moved is reduced to a low ineffective value before the pressure of the fluid in the chamber of the other one of said clutches is built up to an effective value.

9. In control means for use with ship propulsion apparatus which includes an engine, a propeller, a forward fluid pressure operated clutch for connecting said engine to drive said propeller in the forward direction, and a reverse fluid pressure operated clutch for connecting said engine to drive said propeller in the reverse direction, each of said clutches being ineffective to connect the engine and propeller when the fluid in a chamber in the clutch is released and being effective to fully connect the engine and propeller when the pressure of the fluid in the clutch chamber is at a predetermined value, said control means comprising a control member having an off position, said control member being manually movable from said off position in one direction to a forward operating position and in the other direction to a reverse operating position, means effective when said control member is in said off position to cause the fluid in each of said clutch chambers to be maintained at a low ineffective pressure, means effective when said control member is moved to either of its operating positions to cause fluid under pressure to be supplied to the chamber of the corresponding clutch at a restricted rate until a predetermined pressure is built up in said chamber and to thereafter be supplied at a rapid rate, and engine speed control means comprising a control element having an off position and being manually movable therefrom through an operating zone, said engine speed control means being governed by said control element so that when said control element is in its off position the engine operates at its idling speed and so that when said control element is in said operating zone the engine is caused to operate at a predetermined speed slightly higher than the idling speed or to operate at a speed governed by the position of said control element in said operating zone according as the pressure of the fluid in the chamber of the clutch for the direction designated by said control member is substantially below or is at a predetermined pressure.

10. In control means for use with ship propulsion apparatus which includes an engine, a propeller, a forward fluid pressure operated clutch for connecting said engine to drive said propeller in the forward direction, and a reverse fluid pressure operated clutch for connecting said engine to drive said propeller in the reverse direction, each of said clutches being ineffective to connect the engine and propeller when the fluid in a chamber in the clutch is released and being effective to fully connect the engine and propeller when the pressure of the fluid in the clutch chamber is at a predetermined value, said control means comprising a control member having an off position, said control member being manually movable from said off position in one direction to a forward operating position and in the other direction to a reverse operating position, means effective when said control member is in said off position to cause the fluid in each of said clutch chambers to be maintained at a low ineffective pressure, means effective when said control member is moved to either of its operating positions to cause fluid under pressure to be supplied to the chamber of the corresponding clutch at a restricted rate until a predetermined pressure is built up in said chamber and to thereafter be supplied at a rapid rate, and engine speed control means comprising a control element having an off position and being manually movable therefrom through an operating zone, said engine speed control means being governed by said control element and by said control member so that when said control element is in said off position the engine operates at its idling speed and so that when said control element is in its operating zone and said control member is in one of its operating positions the engine is caused to operate at a speed slightly higher than the idling speed or to operate at a speed governed by the position of said control element in said operating zone according as the pressure of the fluid in the chamber of the clutch corresponding to the operating position occupied by said control member is substantially below or is at a predetermined value.

11. In control means for use with ship propulsion apparatus which includes an engine, a propeller, a forward fluid pressure operated clutch for connecting said engine to drive said propeller in the forward direction, and a reverse fluid pressure operated clutch for connecting said engine to drive said propeller in the reverse direction, each of said clutches being ineffective to connect the engine and propeller when the fluid in a chamber in the clutch is released and being effective to establish driving connection between the engine and propeller as the pressure of the fluid in said chamber is increased, each of said clutches being capable of transmitting the power developed by said engine substantially at the idling speed when the pressure of the fluid in the clutch member is at a predetermined intermediate value and being capable of transmitting the power developed by said engine at full speed when the pressure of the fluid in the clutch chamber is at a predetermined high value, said control means comprising a control member having an off position, said control member being manually movable from said off position in one direction through a forward operating zone and in the other direction through a reverse operating zone, means effective when said control member is in said off position to cause the pressure of the fluid in each of said clutch chambers to be maintained at a low ineffective value, means effective when said control member is moved to a position in either of its operating zones to cause fluid under pressure to be supplied to the chamber of the corresponding clutch at a restricted rate until the pressure of the fluid therein is substantially at the predetermined intermediate value and to thereafter supply fluid under pressure at a rapid rate until the pressure of the fluid therein is at the predetermined high value, means effective when said control member is moved from a position in either of its operating zones to the off position or to a position in the other operating zone for causing fluid under pressure to be released at a rapid rate from the chamber of the clutch corresponding to the operating position from which said control member has been moved, the means for controlling the supply of fluid to and the release of fluid from said clutch chambers being arranged so that on rapid movement of said control member between said operating zones the pressure of the fluid in the chamber of the clutch corresponding to the operating position from which said control member has been moved is reduced to a low ineffective value before the pressure of the fluid in the chamber of the other one of said clutches is built up to an effective value, and engine speed control means governed by said control member and by the pressure of the fluid in the chamber of said clutches, said last named means being effective when said control member is in its off position to cause said engine to operate at its idling speed and being effective when said control member is in either of said operating zones to cause said engine to operate at a speed governed by the position of said control member in said operating zone provided the pressure of the fluid in the chamber of the clutch corresponding to the operating zone in which the control member is situated is substantially at said predetermined high value.

12. In combination, a ship drive and control system comprising an engine, a propeller, a fluid pressure operated clutch for connecting said engine to drive said propeller, said clutch being ineffective to connect the engine and propeller when the fluid in a chamber in the clutch is released and being effective to establish driving connection between the engine and propeller as the pressure of the fluid in said chamber is increased, a manually operated valve for supplying fluid under pressure to and for releasing fluid under pressure from a communication through which fluid may be supplied to and released from the chamber in said clutch, a restriction in said communication which limits the rate of flow of fluid to said chamber, a regulating valve device effective on a predetermined increase in the pressure of the fluid in said chamber to open a passage extending around said restriction, and a quick release valve device controlling a passage through which fluid may be released at a rapid rate from said communication at a point intermediate said clutch chamber and said regulating valve device, said quick release valve device being subject to the opposing pressures of the fluid in said chamber and of the fluid in the portion of said communication between said quick release valve and said regulating vavle.

13. In control means for use with ship propulsion apparatus which includes an engine, a propeller, and a fluid pressure operated clutch for connecting said engine to drive said propeller, said clutch being ineffective to connect the engine and propeller when the fluid in a chamber in the clutch is released and being effective to establish driving connection between the engine and propeller as the pressure of the fluid in said chamber is increased, said clutch being capable of transmitting the power developed by said engine substantially at the idling speed when the pressure of the fluid in the clutch chamber is at a predetermined intermediate value and being capable of transmitting the power developed by said engine at full speed when the pressure of the fluid in the clutch chamber is at a predetermined high value, said control means comprising a first control member located at a point remote from said engine and a second control member located at a point adjacent said engine, each of said control members having an off position and being manually movable therefrom through an operating zone to an on position, and manually controlled selecting means for at times rendering one of said control members effective and for at other times rendering the other one of said control members effective, each of said control members being operative when rendered effective and when in its off position to release fluid under pressure from said clutch chamber and to cause said engine to operate at its idling speed, each of said control members being operative when rendered effective and when moved to a position in its operating zone to cause fluid under pressure to be supplied to said clutch chamber at a restricted rate until the pressure therein is substantially at said predetermined intermediate value and to thereafter supply fluid under pressure at a rapid rate to said chamber until the pressure therein is substantially at the predetermined high value, said first control member being operative when rendered effective to vary said engine speed in accordance with the position to which said control member is moved in its operating zone provided the pressure of the fluid in said clutch chamber is substantially at said predetermined high value, said second control member being operative when rendered effective to vary said engine speed in accordance with the position to which said control member is moved in its operating zone irrespective of the pressure of the fluid in said clutch chamber.

14. In control means for use with ship propulsion apparatus which includes an engine, a propeller, a forward fluid pressure operated clutch for connecting said engine to drive said propeller in the forward direction, and a reverse fluid pressure operated clutch for connecting said engine to drive said propeller in the reverse direction, each of said clutches being ineffective to connect the engine and propeller when the fluid in a chamber in the clutch is released and being effective to establish driving connection between the engine and propeller as the pressure of the fluid in said chamber is increased, each of said clutches being capable of transmitting the power developed by said engine substantially at the idling speed when the pressure of the fluid in the clutch chamber is at a predetermined intermediate value and being capable of transmitting the power developed by said engine at full speed when the pressure of the fluid in the clutch chamber is at a predetermined high value, said control means comprising a control member having an off position, said control member being manually movable from said off position in one direction through a forward operating zone and in the other direction through a reverse operating zone, means effective when said control member is in said off position to cause the pressure of the fluid in each of said clutch chambers to be maintained at a low ineffective value, means effective when said control member is moved to a position in either of its operating zones to cause fluid under pressure to be supplied to the chamber of the corresponding clutch at a restricted rate until the pressure of the fluid therein is substantially at the predetermined intermediate value and to thereafter supply fluid under pressure at a rapid rate until the pressure of the fluid therein is at the predetermined high value, means effective when said control member is moved from a position in either of its operating zones to the off position or to a position in the other operating zone for causing fluid under pressure to be released at a rapid rate from the chamber of the clutch corresponding to the operating position from which said control member has been moved, the means for controlling the supply of fluid to and the release of fluid from said clutch chambers being arranged so that on rapid movement of said control member between said operating zones the pressure of the fluid in the chamber of the clutch corresponding to the operating position from which said control member has been moved is reduced to a low ineffective value before the pressure of the fluid in the chamber of the other one of said clutches is built up to an effective value, and engine speed control means governed by said control member and by the pressure of the fluid in the chambers of said clutches, said last named means being effective when said control member is in its off position to cause said engine to operate at its idling speed and being effective when said control member is in either of said operating zones to cause said engine to operate at a predetermined speed slightly higher than the idling speed or to operate at a speed governed by the position of the control member in said operating zone according as the pressure of the fluid in the chamber of the corresponding clutch is substantially below or is substantially at said predetermined high value.

NORMAN E. HUMISTON.

REFERENCES CITED

The following references are of record in the file of this patent:

UNITED STATES PATENTS

| Number | Name | Date |
|---|---|---|
| 1,662,301 | Coykendall | Mar. 13, 1928 |
| 1,701,403 | Coykendall | Feb. 5, 1929 |
| 2,368,885 | Schmitter | Feb. 6, 1945 |

FOREIGN PATENTS

| Number | Country | Date |
|---|---|---|
| 241,760 | Germany | Dec. 14, 1911 |